Feb. 12, 1946.   D. A. MURPHY   2,394,800
ROTARY SWIVEL
Filed June 2, 1941   2 Sheets-Sheet 1

Inventor
Demery A. Murphy
By Lyon & Lyon
Attorneys

Feb. 12, 1946.  D. A. MURPHY  2,394,800
ROTARY SWIVEL
Filed June 2, 1941  2 Sheets-Sheet 2
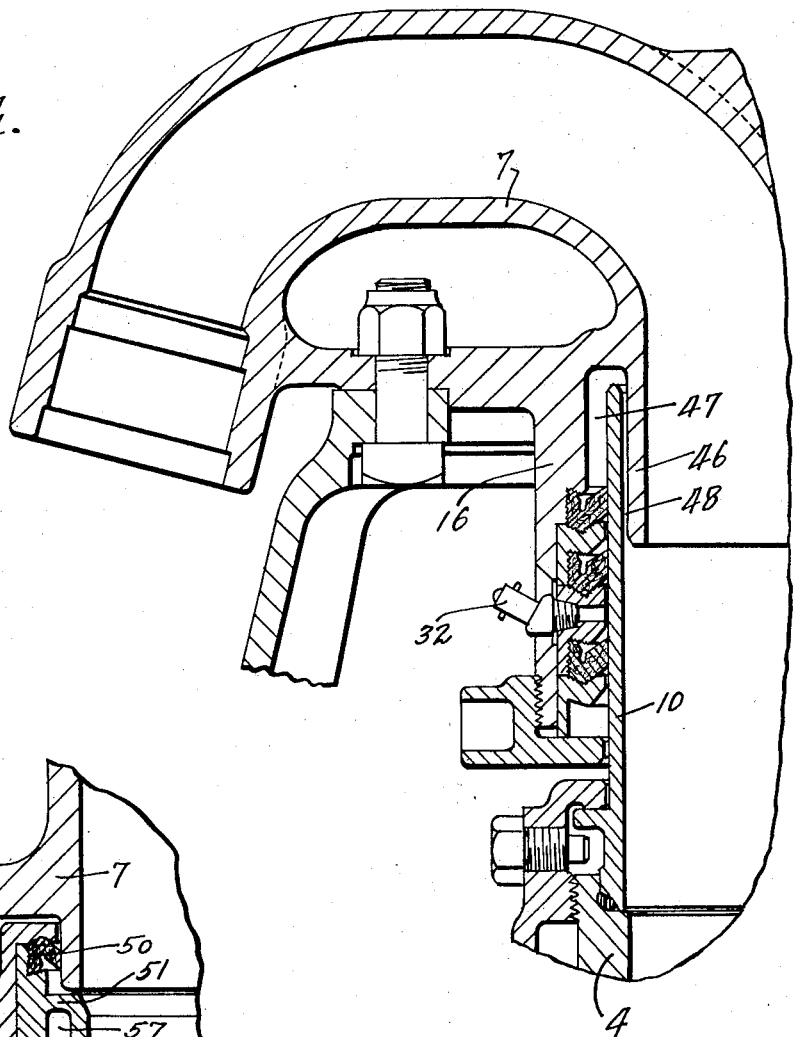
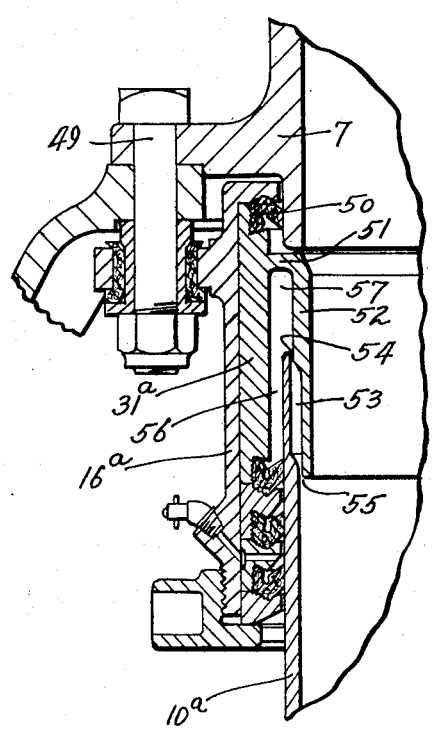
Inventor
Demery A. Murphy
By Lyon & Lyon
Attorneys Patented Feb. 12, 1946

2,394,800

UNITED STATES PATENT OFFICE 2,394,800

ROTARY SWIVEL

Demery A. Murphy, Torrance, Calif., assignor to The National Supply Company, Pittsburgh, Pa., a corporation of Pennsylvania Application June 2, 1941, Serial No. 396,308

12 Claims. (Cl. 285—97.1)

This invention relates to rotary hydraulic swivels of the type employed in the drilling of wells, and is more particularly directed to the improvements to the washpipe and packing assembly thereof.

A rotary hydraulic swivel is employed for the purpose of handling the introduction of the rotary drilling fluid into the drill stem from the circulating pumps. As thus utilized, the structure is particularly subjected to abrasion from the abrasive fluid, i. e., rotary mud which it is conducting.

The principal object of this invention is to provide an improved form of washpipe and packing assembly for use between the stationary gooseneck and the revolving washpipe or rotary spindle.

Another object of this invention is to provide an improved form of resilient packing ring for use in the packing assembly.

Another object of this invention is to provide a packing assembly including a resilient ring V-shaped in cross-section, means for clamping one side of the V under compression and permitting the other side of the V to form a resilient fluid-tight rotary seal.

Another object of this invention is to provide a washpipe packing construction assembly wherein the packing assembly securing structure is formed so as to prevent rotation of the resilient packing ring.

Another object of this invention is to provide a washpipe packing construction which permits the packing assembly to be slidably mounted within a depending housing formed on the stationary gooseneck.

Another object of this invention is to provide an improved means for releasably securing the washpipe to the rotary spindle.

Other objects and advantages of this invention it is believed will be apparent from the following detailed description of a preferred embodiment thereof as illustrated in the accompanying drawings.

In the drawings:

Figure 4 is a sectional view showing a modified form of this invention.

Figure 5 is a sectional view showing a further modification.

Figure 1:
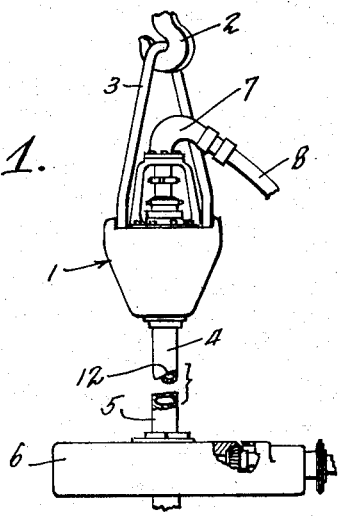
Figure 1 is a side elevation of a rotary swivel embodying my invention illustrating the same as operably associated with a rotary machine.

In the preferred embodiment of my invention illustrated in the accompanying drawings, I indicates a rotary swivel which is suspended by a hook 2 upon its supporting bail 3. The rotary spindle 4 of the swivel I is connected to the kelly 5 which extends through and is driven by means of a rotary machine 6. The rotary swivel is provided with a stationary gooseneck 7 which is connected with the rotary mud hose 8 through which drilling mud is supplied under pressure. This arrangement is well understood in the art.

The fluid passage 9 formed through the gooseneck 7 is aligned with the fluid passage in the washpipe 10. The washpipe 10 is secured to the upper end of the rotary spindle 4 forming the fluid coupling means through which the mud fluid is introduced into the central passage 12 of the rotary spindle.

The washpipe is secured to the upper end of the rotary spindle 4 by means of a collar 13 which is threaded to the upper end of the rotary spindle 4 and is provided with the annular inwardly turned flange 11 to fit over the annular bearing ledge 14 of the bearing foot 15 of the washpipe 10.

The washpipe 10 projects upwardly through the depending cylindrical housing 16 of the gooseneck 7.

The foot 15 of the washpipe is squared off at 17 to abut the shoulder 18 of the rotary spindle 4. A cylindrical guide surface 19 is formed on the foot 15 concentrically of the washpipe axis and bears against the cylindrical guide surface 20 of the rotary spindle 4.

When the collar 13 is screwed downwardly on the rotary spindle 4, the flange 11 and lip 14 and washpipe 10 are moved downwardly until the shoulders 17 and 18 meet in metal to metal relation. A packing ring 21 is located in the junction of the guide surface 20 and the shoulder 18.

In order to provide for the removing of the washpipe 10 from its seated position, the collar 13 is provided with a plurality of radially disposed cap screws 22 which are threaded through the collar 13 and are provided with engaging ends 23 adapted to engage under the annular lip 14 when the collar 13 is unthreaded from the rotary spindle 4 to thereby force the washpipe 10 from its seated position. This construction assures that the washpipe 10 will be raised vertically upward and not tilted when ejected, as any appreciable tilting would injure the mating surfaces 17, 18, 19 and 20.

Within the cylindrical housing 16 there is mounted a packing assembly generally designated as 24. The assembly 24 includes a plurality of non-metallic resilient packing or sealing rings 25, 26 and 27 and a plurality of rigid metallic spacers 28, 29, 30 and 31 stacked in alternating relation. One of the intermediate spacers as, for example, the spacer 29, is bored radially to receive a lubricating fitting 32 which extends through a window 33 formed in the cylindrical housing 16. The lowermost spacer 28 rests on the flange 34 of a nut 35, which nut 35 is threaded on the lower end of the cylindrical housing 16. When the nut 35 is screwed up to operative position, the spacers 28, 29, 30 and 31 are clamped solidly in metal to metal relation between the flange 34 and the abutment 36, and are thereby prevented from rotating. A sealing ring 37 is provided between the uppermost spacer 31 and the gooseneck 7 to prevent leakage of mud fluid behind the spacers and to within the bore of the cylindrical housing.

The resilient rings 25, 26 and 27 are all of the same construction. They are preferably molded under pressure and heat to produce a continuous ring of preformed shape and inherent resiliency. The material employed preferably comprises a plurality of laminations of continuous rings (or a continuous spiral ring) of canvas duck alternated with rubber or a rubber substitute such as neoprene. This continuous construction has no joint, and is therefore superior to ordinary rings which are formed as split rings and then later joined together.

The rings are each formed with a rim or axial wall 38 integrally connected with an inwardly directed lip 39. The wall 38 is adapted to be axially compressed between the contacting metallic spacers 28, 29, 30 and 31, while the inwardly slanting lip 39 is not held but is adapted to contact the surface of the washpipe 10 to form a rotary seal.

Figure 3:
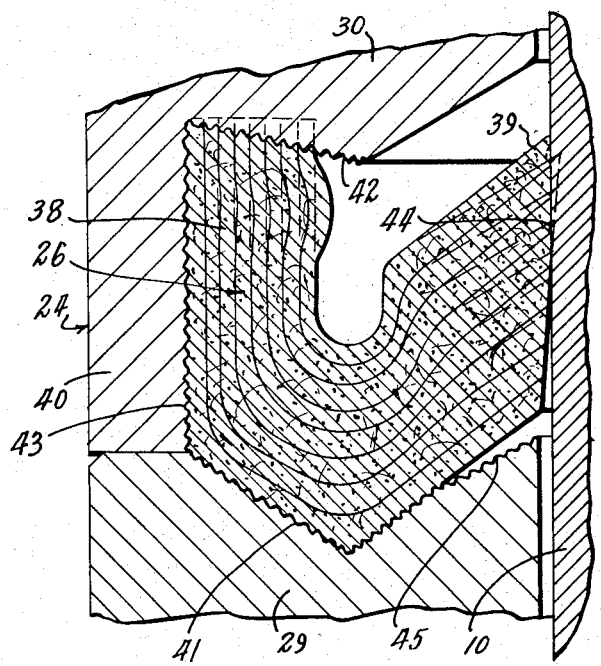
Figure 3 is a further enlarged fragmental sectional view of one of the packing elements embodied in my invention.

The spacers 28, 29, 30 and 31 are formed to provide depending annular rims 40 which encircle the packing member walls 38 and these rims 40 rest on the upper ends of the spacers immediately below them. The dotted lines in Figure 3 illustrate the initial free shape of the resilient wall 38 before compression between the spacers. When the spacers are brought into contact by means of the nut 35, the resilient wall 38 is compressed and distorted to the shape illustrated in full lines in Figure 3. Each of the spacers is provided with a V-shaped recess or trough 41 to receive the bottom of the resilient packing rings. The under surface 42 of each spacer is formed slanting downward toward the axis of the washpipe so that the wall 38 is wedged between the sloping surfaces 41 and 42.

The inner surface 43 of the rim 40, as well as the surfaces 41 and 42, are each scored or knurled to provide roughened surfaces against which the relatively soft material of the ring 38 is forced under the application of the hydraulic pressure to hold the ring 38 from rotation.

It will be observed from the foregoing that the surface 44 of the lip 39 is unsupported except for the rigidity of the structure of the ring 26 so that the face 44 is yieldably held in contact with the washpipe 10. With this construction the laminations in the lip 39 are disposed at the most desirable angle to effectively oppose the hydraulic pressure while the vertical laminations of the wall 38 impart maximum strength to resist the compressive stresses imposed under the clamping effect of the spacers. The face or bore 44 of the resilient ring 26 is initially formed slightly conical rather than cylindrical in order to seal effectively at both low and high pressures. The position of the lip 39 of the ring as shown in Figure 3 is the position the resilient ring assumes under low or medium hydraulic pressures. When subjected to high pressure, the lip 39 of the ring rests on the annular shelf 45.

A feature of the construction as disclosed is that the packing assembly 24 is easily insertable and removable through the lower end of the cylindrical housing 16 since the spacers 28, 29, 30 and 31 are each mounted for free sliding movement in the housing 16. Any tendency of the rings 25, 26 and 27 to stick to the spacers does not therefore prevent easy removal of the packing assembly 24 as a unit.

Figure 2:
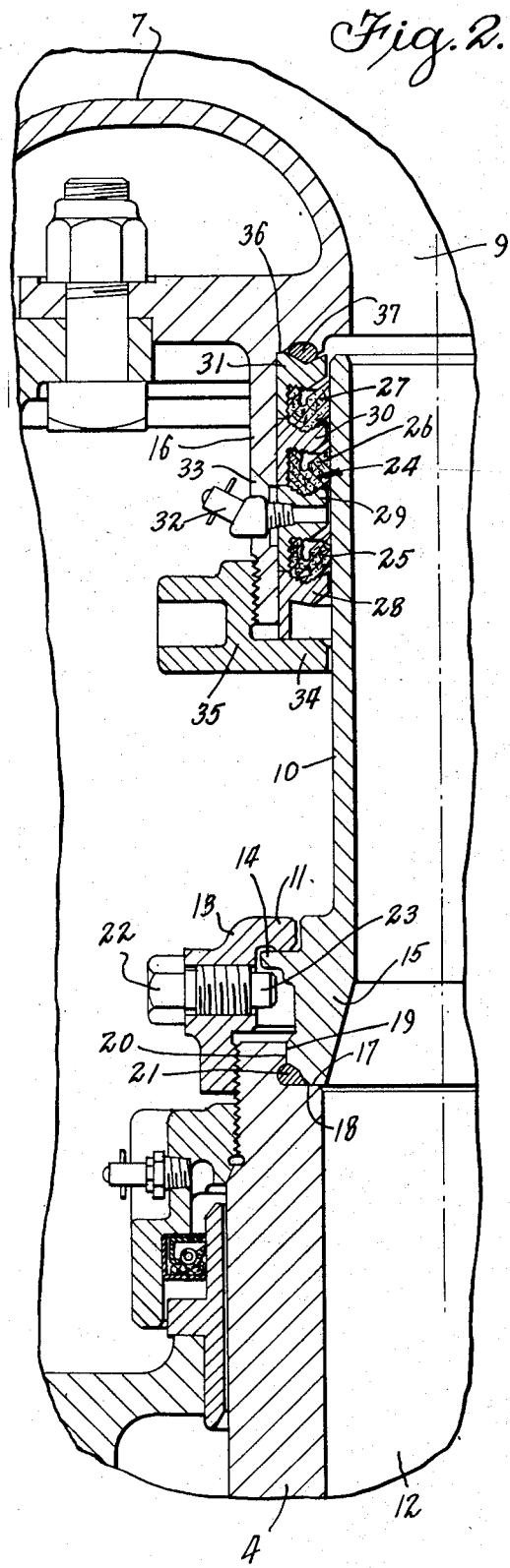
Figure 2 is an enlarged fragmental sectional view thereof.

The modified form of this invention shown in Figure 4 is generally similar to that shown in Figure 2 with the addition of a stationary annular skirt 46 depending from the gooseneck 7 within the washpipe 10. This arrangement provides a primary grease chamber 47 between the housing 16 and the washpipe 10, and a secondary grease chamber or channel 48 between the washpipe 10 and the skirt 46. Grease injected through the fitting 32 fills both chambers 47 and 48 and thereby prevents the abrasive-laden mud fluid from contacting the packing rings.

The modified construction illustrated in Figure 5 shows a packing house 16a of the type disclosed in the Shaw, et al. Patent No. 2,237,715. This housing 16a is not formed integral with the gooseneck 7 but is supported therefrom by means of the bolts 49. Leakage is prevented between the housing 16a and gooseneck 7 by means of the sealing ring 50. The metallic spacer 31a is provided with an inwardly extending flange 51 and a depending annular skirt 52 which extends within the washpipe 10a. The telescoping portions of the washpipe 10a and skirt 52 are formed to provide a secondary grease chamber 53 having its ends defined by restrictions 54 and 55. The primary grease chamber 56 between the washpipe 10a and the spacer 31a communicates with the secondary chamber 53 by way of the restriction 54. The clearance space 57 between the upper end of the washpipe 10a and the flange 51 forms additional space for grease and furthermore is necessary for purposes of assembly.

Having fully described my invention, it is to be understood that I do not wish to be limited to the details herein set forth, but my invention is of the full scope of the appended claims.

I claim:

1. In a hydraulic rotary swivel, the combination of a rotary member, a stationary member, one of the members encircling the other and defining between them an annular recess, packing means in said recess including an annular resilient packing ring having a substantially V shaped cross section, clamping means non-rotatably fixed on one of the members adapted to clamp one side of the V under compression to prevent rotation of the resilient packing ring relative to that member, the clamping means including non-resilient elements which meet in end to end contact to limit initial distortion of the resilient packing ring, the other side of the V being free and unrestricted and adapted to contact the other member to form a rotary seal.

2. In a hydraulic rotary swivel, the combination of a rotary member, a stationary member, one of the members encircling the other and defining between them an annular recess, packing means in said recess including an annular resilient packing ring having a substantially V shaped cross section, one side of the V extending substantially axially of the members and the other side being thicker and extending inwardly on an angle, clamping means non-rotatably fixed on the outer member adapted to clamp the axially extending side of the V under compression to prevent rotation of the resilient packing ring relative to the outer member, the clamping means including non-resilient elements which meet in end to end contact to limit initial distortion of the resilient packing ring, the thick side of the V being free and unrestricted and adapted to form a rotary seal with the inner member.

3. In a hydraulic rotary swivel, the combination of a rotary member, a stationary member, one of the members encircling the other and defining between them an annular recess, packing means in said recess including an annular resilient packing ring having a laterally extending lip portion and a rim portion extending in a substantially axial direction, separable non-resilient elements adapted to confine the resilient packing ring therebetween, one of said elements having an annular shoulder and the other having an annular groove, clamping means non-rotatably fixed on one of said relatively rotatable members adapted to clamp the said rim portion under compression between said shoulder and said groove to secure the resilient packing ring against rotation relative to said member, said non-resilient elements having portions adapted to meet in end to end contact to limit initial distortion of the rim portion of the resilient packing ring, the lip portion of the ring contacting the other member to form a rotary seal.

4. A washpipe for a hydraulic rotary swivel having in combination a tubular portion provided with an external cylindrical wear surface, a radially extending flange on the washpipe providing an annular abutment on both its upper and lower surfaces, a downwardly facing shoulder formed on the lower end of the washpipe and lying in a plane parallel to the plane of the upper abutment, a cylindrical alignment surface disposed coaxially of said cylindrical wear surface and positioned below both of said abutments, and a bevel surface connecting said shoulder and the cylindrical alignment surface, to present a seating surface for packing.

5. A coupling connection for securing a washpipe to a rotary spindle, comprising a radially extending flange, a nut threaded on said spindle and having a portion adapted to overlie said flange whereby the lower end of the washpipe may be clamped against the spindle, and a plurality of radially movable ejector elements mounted on said nut and each having a portion thereof adapted to underlie said flange, whereby unthreading of the nut relative to the spindle may be utilized to separate the washpipe and spindle, said ejector elements each being retractable to an inoperative position whereby separation of the nut and washpipe may be effected.

6. A coupling connection for securing a washpipe to a rotary spindle, comprising a radially extending flange, a counterbore in the upper end of the spindle terminating in an annular shoulder, a nut threaded on said spindle and having a portion adapted to overlie said flange whereby the lower end of the washpipe may be clamped against said annular shoulder, a cylindrical alignment surface below the flange adapted to fit within said counterbore, packing means operatively positioned between the spindle and the coupling, and an ejector element threadedly mounted on said nut and having a portion thereof adapted to underlie said flange, whereby unthreading of the nut relative to the spindle may be utilized to separate the washpipe and spindle.

7. In a rotary swivel, the combination of a body, a spindle rotatably supported by the body, a washpipe carried on the upper end of the spindle and rotatable therewith, a support on said body, a stationary gooseneck mounted on said support and having a depending housing integral therewith, said housing encircling a portion of the washpipe to define a packing recess therebetween, packing means in said recess including an annular resilient packing ring confined under compression between two annular non-resilient elements, a portion of the resilient ring contacting the washpipe to form a rotary seal, said elements being freely insertable axially into said recess, an axially extending annular wall associated with said elements laterally confining the resilient packing ring and preventing contact between the ring and the housing, and releasable means to clamp the elements in position in said housing.

8. In a rotary swivel, the combination of a body, a spindle rotatably supported by the body, a washpipe carried on the upper end of the spindle and rotatable therewith, a support on said body, a stationary gooseneck mounted on said support and having a depending housing integral therewith, said housing having a central bore adapted to encircle a portion of the washpipe to define a packing recess therebetween, a packing assembly in said recess slidably mounted with respect to said bore, said packing assembly including an annular resilient ring adapted to contact the washpipe to form a seal but confined by the packing assembly to prevent contact with the bore of the housing, and means including a nut threaded on the housing adapted to secure the packing assembly against rotation.

9. In a hydraulic rotary swivel, the combination of a rotary spindle, a stationary gooseneck, a washpipe secured to rotate with the spindle and adapted to receive fluid under pressure from said gooseneck, a non-rotatable depending packing housing associated with said gooseneck and encircling a portion of the washpipe to define an annular packing recess, packing means in said recess, a primary lubricant chamber above the packing and encircling the upper end of the washpipe, a non-rotatable annular skirt depending into the upper end of the washpipe and cooperating therewith to define a secondary lubricant chamber, said primary and secondary lubricant chambers being in communication at their upper ends and said secondary lubricant chamber being exposed to the fluid pressure at its lower end, and means to inject lubricant into said primary lubricant chamber.

10. In a hydraulic rotary swivel, the combination of a rotary spindle, a stationary gooseneck, a washpipe secured to rotate with the spindle, a non-rotatable depending packing housing associated with said gooseneck and encircling a portion of the washpipe to define an annular recess for packing, packing means in said recess, a stationary annular depending skirt formed on said gooseneck and projecting within the upper end of the washpipe in telescopic relation, and means to inject lubricant upwardly through a portion of said packing recess and downwardly through the annular space between the skirt and the washpipe.

11. In a hydraulic rotary swivel, the combination of a rotary spindle, a stationary gooseneck, a washpipe secured to rotate with the spindle, a packing housing secured non-rotatably with respect to said gooseneck and encircling a portion of said washpipe, a pair of axially spaced annular resilient sealing rings carried within the housing, one of the rings contacting the gooseneck and the other contacting the washpipe, a non-resilient spacer element positioned within said housing and interposed between said sealing rings, said spacer element being provided with an annular skirt adapted to depend within the upper end of the washpipe in telescopic relation, and means to inject lubricant into the annular space between the skirt and the washpipe.

12. In a hydraulic rotary swivel, the combination of a rotary member, a stationary member, one of the members encircling the other and defining between them an annular recess, packing means in said recess including an annular resilient sealing ring provided with an inwardly directed lip, the sealing surface of said lip being initially conical with the small end facing the direction of the applied hydraulic pressure, means acting independently of said lip adapted to secure said ring non-rotatably with respect to one of said members, an annular shelf associated with said means and extending under said lip but having initial clearance with respect thereto, said shelf being adapted to support said lip and prevent excessive deformation of the ring under applied hydraulic pressure.

DEMERY A. MURPHY.